United States Patent
Bahrami et al.

(10) Patent No.: US 12,142,137 B1
(45) Date of Patent: Nov. 12, 2024

(54) SYSTEMS, METHODS, AND DEVICES FOR ENVIRONMENTAL MONITORING

(71) Applicant: SenseNet Inc., Vancouver (CA)

(72) Inventors: Shahab Bahrami, Vancouver (CA); Hamed Noori, Vancouver (CA)

(73) Assignee: SenseNet Inc., Vancouver (CA)

( * ) Notice: Subject to any disclaimer, the term of this patent is extended or adjusted under 35 U.S.C. 154(b) by 0 days.

(21) Appl. No.: 18/428,862

(22) Filed: Jan. 31, 2024

(51) Int. Cl.
*G08C 17/02* (2006.01)
*H04W 4/02* (2018.01)
*H04W 4/38* (2018.01)
*H04W 84/18* (2009.01)

(52) U.S. Cl.
CPC ............. *G08C 17/02* (2013.01); *H04W 4/02* (2013.01); *H04W 4/38* (2018.02); *H04W 84/18* (2013.01)

(58) Field of Classification Search
None
See application file for complete search history.

(56) References Cited

U.S. PATENT DOCUMENTS

| | | | | |
|---|---|---|---|---|
| 2017/0012884 A1* | 1/2017 | Ho | ......................... | H04L 1/0009 |
| 2023/0108654 A1* | 4/2023 | McRae | .................. | G06V 20/44 |
| | | | | 340/506 |

FOREIGN PATENT DOCUMENTS

| | | | | |
|---|---|---|---|---|
| CN | 110913359 | A | * | 3/2020 |
| CN | 210490907 | U | * | 5/2020 |

* cited by examiner

*Primary Examiner* — Adolf Dsouza
(74) *Attorney, Agent, or Firm* — Own Innovation; Daniel Biggs; James W. Hinton

(57) ABSTRACT

The environmental data monitoring system comprises an array of sensing nodes, disposed spaced-apart and arranged in a linear topology along a communication path, the array including: a tail-end node; a head-end node; and a plurality of intermediate nodes, the intermediate nodes including a first intermediate node disposed towards the head-end node; a last intermediate node arranged towards the tail-end node; and a plurality of middle intermediate nodes disposed between the first and the last intermediate nodes. The system provides for environmental data collection and analysis using a network of linearly arranged sensing nodes, each determining and transmitting location-indexed environmental data, culminating in a comprehensive data stream aggregated and analyzed by a cloud server.

19 Claims, 4 Drawing Sheets

SYSTEMS, METHODS, AND DEVICES FOR ENVIRONMENTAL MONITORING

TECHNICAL FIELD

The following relates generally to environmental monitoring and data collection, and more particularly to systems, methods, and devices for collecting and processing environmental data from an array of sensing nodes arranged in a linear topology.

INTRODUCTION

Monitoring environmental data is a critical aspect of environmental management, playing a vital role in applications such as pollution control, natural disaster management, and climate change research. It is also instrumental in comprehending the impact of human activities on natural ecosystems and aids in devising strategies to mitigate potential adverse effects. Environmental data monitoring systems gather information on a range of environmental parameters, including air, water, and soil quality, as well as temperature and humidity. The data collected is utilized to track changes in environmental conditions, identify potential environmental hazards, and facilitate decision-making in real-time.

Existing environmental monitoring systems often face limitations in terms of scope, accuracy, or real-time capabilities. Many such systems depend on manual data collection and analysis, which may be labor-intensive, prone to errors, and expensive. This manual approach restricts the frequency of data collection, potentially leading to gaps in data and missed opportunities to identify trends or anomalies. Moreover, manually collected data may be subjective and vary depending on the individual collecting it, introducing bias and inconsistency. To address these issues, multiple automatic sensing devices are deployed at various locations to transmit data to a central server for analysis. Nonetheless, these automated systems may experience challenges such as high power consumption, limited communication range, and inefficient data transmission.

Traditional al monitoring systems often utilize batch processing, where data is collected at predetermined intervals and analyzed offline. This approach may result in significant delays in data processing, hindering real-time decision-making and response capabilities. In scenarios like natural disasters, access to real-time data provides for timely decisions. Additionally, these systems are vulnerable to data loss or transmission errors, which may stem from various factors like power outages, network disruptions, or sensor malfunctions. Such errors may lead to incomplete or inaccurate data, undermining the reliability and effectiveness of the monitoring system.

Accordingly, systems, methods, and devices are desired that overcome one or more disadvantages associated with existing solutions for collecting and processing environmental data.

SUMMARY

An environmental data monitoring system is provided. The system includes an array of sensing nodes, disposed in a spaced-apart manner and arranged in a linear topology along a communication path, the array including a tail-end node and a head-end node. The tail-end node is configured to transmit a tail environmental data stream sensed thereby to a preceding node. The array of sensing nodes transmits the environmental data to a cloud server.

The environmental data monitoring system may further include a plurality of intermediate nodes including a first intermediate node disposed towards the head-end node, a last intermediate node arranged towards the tail-end node, and a plurality of middle intermediate nodes disposed between the first and the last intermediate nodes.

The environmental data monitoring system may be configured to automatically select a network protocol from a plurality of network protocols based on the location of each sensing node or a network protocol received from another sensing node in the array.

Each of the tail-end node, the intermediate nodes, and the head-end node may include a position determination sensor for determining the current location of the respective node, an environmental parameter determination sensing module for sensing one or more environmental parameters and indexing the sensed parameters with the determined current location to create an environmental data stream, a wireless connectivity module for transmitting the environmental data stream, and a power source for providing electric energy for operation of the respective node.

The last intermediate node may be configured to incorporate a last intermediate environmental data stream sensed thereby with the received data stream from the tail-end node to create a first data point.

Each middle intermediate node may be configured to incorporate and propagate a middle intermediate environmental data stream sensed thereby to the first data point towards the first intermediate node.

The first intermediate node may be configured to incorporate an environmental data stream sensed by the first intermediate node with the propagated environmental data stream and the first data point to create a second data point.

The head-end node may be configured to receive the second data point, incorporate a head environmental data stream sensed thereby to create a third data point, and transmit the third data point to the cloud server.

The cloud server may be communicably coupled with a LoRaWAN Gateway for receiving the third data point from the head-end node.

Each node may be configured to selectively operate in one of a LoRa to LoRaWAN mode or a LoRa Repeater mode.

The power source of each sensing node may be a rechargeable battery or a high-capacity non-rechargeable battery.

The nodes may each sense one or more environmental parameters selected from the group consisting of carbon monoxide (CO), particulate matter, hydrogen sulfide ($H_2S$), volatile organic compounds (VOCs), volatile sulfur compounds (VSCs), sulfur dioxide ($SO_2$), carbon dioxide ($CO_2$), nitrogen dioxide ($NO_2$), methane, temperature, and humidity.

The cloud server may be configured to assign frequency channels to each node for data transmission, optimize transmission times, and manage network efficiency through selective activation and deactivation of nodes to conserve energy, and process and analyze collected data using machine learning or artificial intelligence-based techniques.

An environmental data monitoring device is provided. The device includes a position determination sensor for determining a geographic location of the environmental monitoring device, an environmental parameter determination sensing module capable of measuring one or more environmental parameters selected from the group consisting of carbon monoxide (CO), particulate matter, hydrogen sulfide ($H_2S$), volatile organic compounds (VOCs), volatile sulfur compounds (VSCs), sulfur dioxide ($SO_2$), carbon dioxide ($CO_2$), nitrogen dioxide ($NO_2$), methane, temperature, and humidity, a wireless connectivity module for facilitating data transmission within a network, and a power source including a dual battery system comprising a rechargeable battery and a high-capacity non-rechargeable battery, and a power management circuit to switch between the batteries based on the charge levels of the respective batteries. The environmental monitoring device is configured to be arranged in a linear topology within the network.

The position determination sensor may include one or more of Global Positioning System (GPS) or Global Navigation Satellite System (GNSS) for accurately determining the geographic location.

The wireless connectivity module may include LoRaWAN technology for long-range and low-power communication between nodes.

A method for collecting environmental data is provided. The method includes disposing in a spaced-apart manner an array of sensing nodes in a linear topology along a communication path, the array of sensing nodes including a tail-end node, a head-end node, and a plurality of intermediate nodes disposed between the tail-end node and the head-end node, the intermediate nodes including a first intermediate node disposed towards the head-end node, a last intermediate node arranged towards the tail-end node, and one or more middle intermediate nodes disposed between the first intermediate node and the last intermediate node. The method further includes at each of the sensing nodes, determining a current location, sensing a plurality of environmental parameters and indexing the plurality of environmental parameters with the current location to create an environmental data stream for each node. The method further includes transmitting the environmental data stream from the tail-end node to the last intermediate node and incorporating, at the last intermediate node, the received environmental data stream from the tail-end node with an environmental data stream sensed at the last intermediate node to create a first data point. The method further includes sequentially incorporating and propagating, at each of the middle intermediate nodes and at the first intermediate node, respective sensed environmental data streams, each middle intermediate node adding the respective sensed data stream to the first data point and the first intermediate node further incorporating the respective sensed environmental data stream to create a second data point. The method further includes receiving the second data point at the head-end node and incorporating the environmental data stream sensed by the head-end node with the second data point to create a third data point. The method further includes transmitting the third data point from the head-end node to a cloud server for storage and analysis.

Each of the sensing nodes may include a position determination sensor and an environmental parameter determination sensing module for determining the current location and the environmental parameters, respectively.

The environmental parameters determined at each sensing node may include at least one of carbon monoxide (CO), particulate matter, hydrogen sulfide ($H_2S$), volatile organic compounds (VOCs), volatile sulfur compounds (VSCs), sulfur dioxide ($SO_2$), carbon dioxide ($CO_2$), nitrogen dioxide ($NO_2$), methane, temperature, and humidity.

Transmitting the third data point to the cloud server may include using a wireless connectivity module, the wireless connectivity module including at least one of LoRaWAN, Wi-Fi, Zigbee, or cellular network technologies.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of systems, methods, and devices of the present specification. In the drawings.

DETAILED DESCRIPTION

Figure 1:
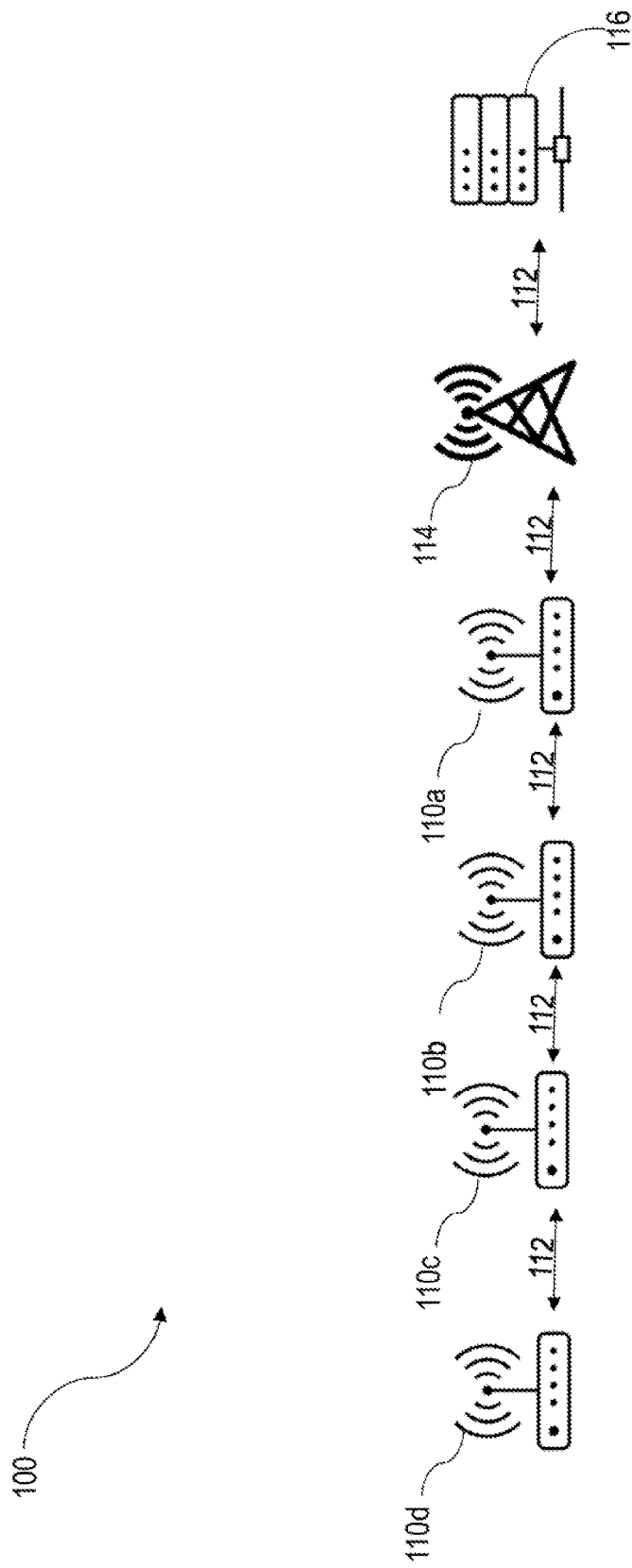
FIG. 1 is a schematic diagram illustrating a system for environmental data monitoring, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, personal computer, cloud-based program or system, laptop, personal data assistant, cellular telephone, smartphone, or tablet device.

Each program is preferably implemented in a high-level procedural or object-oriented programming and/or scripting language to communicate with a computer system. However, the programs may be implemented in assembly or machine language, if desired. In any case, the language may be a compiled or interpreted language. Each such computer program is preferably stored on a storage medium or a device readable by a general—or special-purpose programmable computer for configuring and operating the computer when the storage medium or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms, or the like may be described (in the disclosure and/or in the claims) in a sequential order, such processes, methods, and algorithms may be configured to work in alternate orders. Accordingly, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device or article (whether or not they cooperate) may be used in place of a single device or article. Similarly, where more than one device or article is described herein (whether or not they cooperate), it will be readily apparent that a single device or article may be used in place of the more than one device or article unless the context indicates otherwise.

The following relates generally to environmental monitoring, and more particularly to systems, methods, and devices for environmental data monitoring.

Environmental data monitoring systems provide for systematically tracking various environmental parameters such as air and water quality, radiation levels, and the presence of hazardous substances. Further, the systems provide essential data for assessing the health of ecosystems. This information is vital for formulating environmental policies, enforcing regulations, and undertaking remedial actions in case of ecological imbalance or contamination. Moreover, environmental monitoring systems are applied for research in fields like ecology, meteorology, and geoscience, offering empirical evidence to support scientific theories and models about environmental processes and changes.

For public health and safety, monitoring environmental data including air quality helps in predicting and managing health risks related to pollution. Further, water quality monitoring provides for ensuring safe drinking water and maintaining aquatic biodiversity. In the context of climate change, these systems provide for tracking greenhouse gas emissions and understanding their impact on global warming. Additionally, in disaster-prone areas, real-time environmental monitoring may provide early warnings for events like tsunamis, earthquakes, or chemical spills, enabling quicker response and potentially saving lives and minimizing property damage.

Where data is incorporated along the linear topology discussed in the present disclosure, such data may be incorporated by adding or combining the data at each node and then sending the added or combined data upstream, or by sending data upstream at each node and adding or combining the data at the upstream node (e.g., at the head-end node).

The present disclosure and the systems, methods, and devices discussed hereinbelow and further recited in the claims appended hereto may be particularly suitable in the wildfire context, specifically for detecting wildfires by monitoring, sensing, and/or measuring environmental parameters indicative of, correlated to, or otherwise of interest with respect to wildfires. For example, the systems and devices of the present disclosure may be installed or the methods may be performed alongside power transmission lines. Such systems, methods, and devices operating alongside power transmission lines may detect fires started along the power transmission lines and/or clues, indicia, or further data on same (indicating a possible fire). Such systems, methods, and devices operating alongside power transmission lines may be able to collect such clues, indicia, or further data at a distance from the power transmission lines (e.g., 5-10 km away).

Referring now to FIG. 1, shown therein is a schematic diagram illustrating a system 100 for environmental data monitoring, according to an embodiment.

The system 100 provides for efficiently monitoring a broad spectrum of environmental parameters and seamlessly integrates and analyzes data across various environmental factors.

The system 100 includes a plurality of data collecting devices 110a, 110b, 110c, and 110d (collectively referred to as the data collecting devices 110 or sensing nodes 110 and generically referred to as the data collecting device 110 or sensing node 110), a network 112 configured to provide communication between the components of the system 100, a network gateway 114 configured to provide an interface and network services between different network protocols and technologies, and a network server 116 configured to provide network services including data processing, storage, application and device management, and resource sharing. In an embodiment, the system 100 includes a plurality of application servers (not shown) and a plurality of user terminals (not shown) for environmental data monitoring applications.

In an embodiment, the sensing nodes 110 are disposed as an array at spaced-apart intervals and arranged in a linear topology. This linear arrangement is aligned along a communication path, enabling efficient data collection and transmission. The configuration of the sensing nodes 110 facilitates optimal coverage and precise environmental data acquisition from multiple points, enhancing the overall effectiveness and accuracy of the environmental data monitoring system 100.

In an embodiment, the sensing nodes 110 include a specific configuration of nodes, comprising a tail-end node 110d, a plurality of intermediate nodes designated as 110c and 110b (collectively referred to as the intermediate nodes 110 and generically referred to as the intermediate node 110), and a head-end node 110a. The linear arrangement shown in FIG. 1 facilitates the seamless transmission of environmental data along the array. The data collected by these nodes is effectively relayed through this structured network 112, ultimately reaching the cloud server 116 through the network gateway 114. Upon receipt by the cloud server 116, the environmental data undergoes processing and analysis. The configuration shown in FIG. 1 ensures efficient data flow and robust processing capabilities, thereby enhancing the system's overall performance in monitoring and analyzing environmental conditions.

The term "linear topology of sensing nodes" refers to an arrangement of sensing nodes 110 wherein the nodes are connected in a sequential manner, thereby forming a linear sequence akin to a chain or line. In an embodiment of this configuration, each node-excluding the head-end node 110a and the tail-end node 110d—is interconnected with two adjacent nodes: one immediately preceding it and one immediately succeeding it (for example, the intermediate node 110c is immediately preceded by the intermediate node 110b and immediately succeeded by the tail-end node 110d). Specifically, the head-end node 110a establishes a connection with the first intermediate node 110b. Conversely, the tail-end node 110d connects exclusively with the last intermediate node 110c. The linear configuration of the sensing nodes 110 streamlines the flow of data along the communication path, significantly simplifying the process of data transmission and aggregation within the system.

The linear arrangement of the array of sensing nodes 110 may present several notable advantages. The advantages include, but are not limited to, predictable and deterministic communication, streamlined routing and addressing, minimized interference, simplified network planning and deployment, reduced latency, and decreased power consumption. In this linear topology, the communication path between the nodes 110 is established in a fixed and predictable manner, fostering deterministic communication. This aspect is particularly advantageous in time-sensitive applications, such as real-time monitoring and control systems, where reliable and timely data transmission is crucial.

Moreover, the linear arrangement of the sensing nodes 110 simplifies the routing and addressing process, as each sensing node 110 is configured to communicate only with its immediate neighbors. The setup reduces the overhead and complexity associated with network management, leading to more efficient operations. Additionally, the straight-line placement of the sensing nodes 110 in the linear topology inherently reduces radio frequency interference between the sensing nodes 110, enhancing the quality and reliability of communications. Furthermore, due to the proximity of communication between adjacent sensing nodes 110, the power consumption within this topology is lower compared to more complex arrangements, where the sensing nodes 110 may otherwise relay information across longer distances or through a plurality of intermediate sensing nodes 110. The energy-efficient design is beneficial for sustainable and long-term environmental monitoring applications.

In an embodiment, the first intermediate node, 110*b*, is positioned in proximity to the head-end node 110*a*, thereby establishing the beginning of the linear sequence of the intermediate nodes 110. The last intermediate node 110*c*, is strategically arranged adjacent to the tail-end node 110*d*, marking the end of the sequence. Between these two points, the first and last intermediate nodes, there may be a plurality of middle intermediate nodes, designated as 110*b*1, 110*b*2, (not shown), and so forth, up to 110*b$_n$*. The middle intermediate nodes are systematically disposed between the first intermediate node 110*b* and the last intermediate node 110*c*. The arrangement provides for a coherent and efficient linear progression of nodes within the system, facilitating the seamless flow of data and communication across the entire array.

It will be appreciated by one of skill in the art that more or fewer sensing nodes 110 may be provided in an embodiment of the invention than are shown in FIG. 1 or discussed herein. The claimed embodiments are not limited to any specific number or minimum or maximum number of nodes 110 except insofar as such limitations are explicitly recited in the claims hereinbelow.

Figure 3:
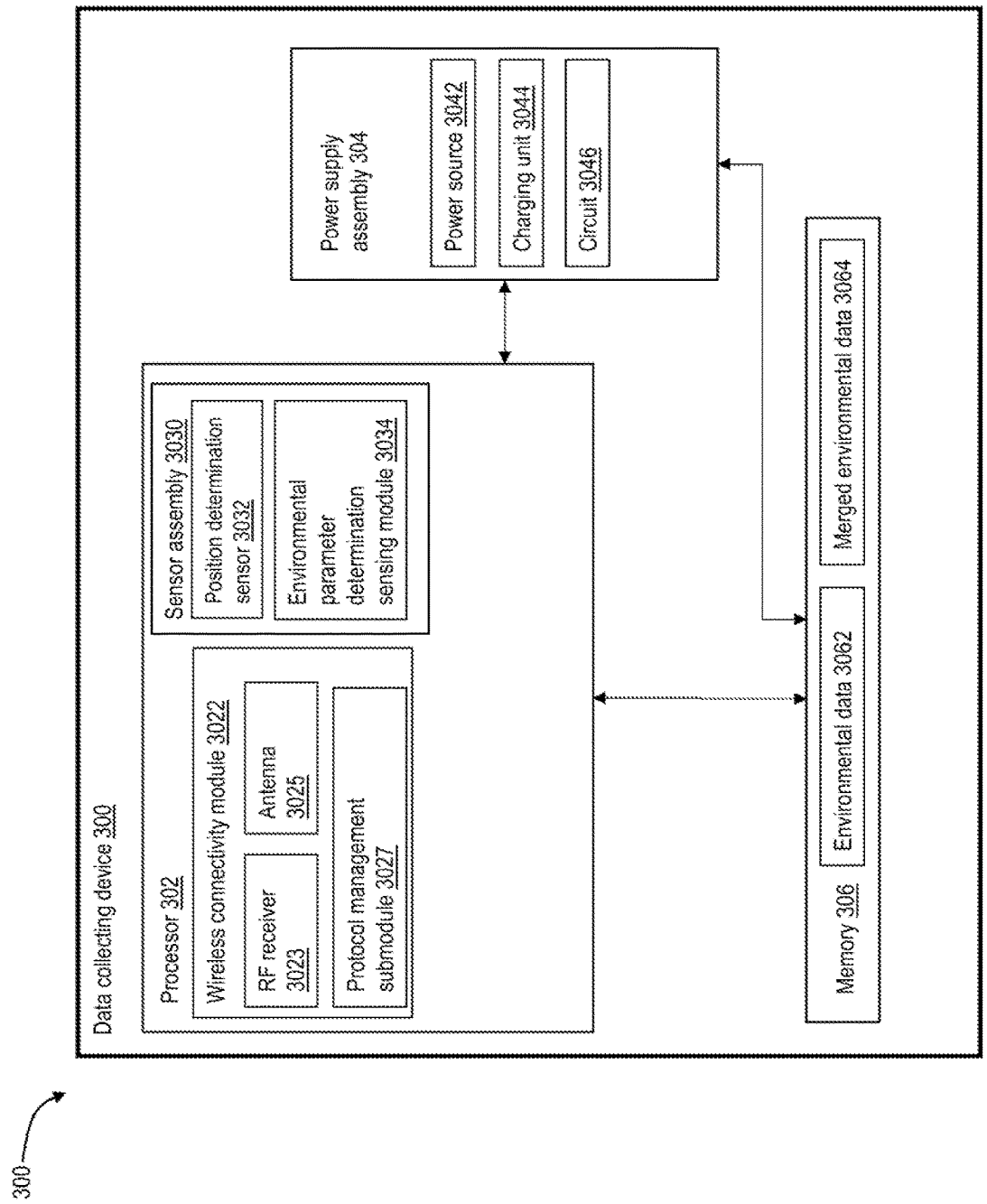
FIG. 3 is a block diagram of a data collecting device for environmental data monitoring, according to an embodiment.

In an embodiment and as further discussed with respect to FIG. 3, a sensing node 110 within the system 100 is provided with a comprehensive suite of components, enhancing its functionality and efficiency. The components include a position determination sensor, an environmental parameter determination sensing module, a wireless connectivity module (such as a LoRaWAN transceiver), and a power source. The position determination sensor provides for ascertaining the current geographical location of each node. This functionality provides for accurately indexing the environmental data collected, ensuring that each data point is precisely associated with its geographic origin.

Furthermore, the environmental parameter determination sensing module is configured to measure a variety of environmental parameters. The data collected by this module is systematically indexed with the current geographical location, resulting in the creation of an enriched environmental data stream. The integration of locational and environmental data enhances the depth and usability of the information gathered, allowing for more nuanced analysis and application. The inclusion of a wireless connectivity module, such as a LoRaWAN transceiver, facilitates efficient and reliable communication between the nodes 110 and other components of the system 100. Additionally, the integrated power source ensures the sustained operation of each node, making the system robust and reliable for long-term environmental monitoring.

In an embodiment, the position determination sensor utilizes a variety of technologies to achieve precise location determination, including but not limited to the Global Positioning System (GPS), Global Navigation Satellite System (GNSS), or other advanced localization techniques. The capability of each sensing node 110 to calculate its coordinates accurately enables associating the collected environmental data with specific geographic locations. The feature not only provides spatial context to the gathered information but also facilitates the creation of detailed, location-specific environmental maps, enhancing the utility and applicability of the data.

In an embodiment, the environmental parameter determination sensing module measures a comprehensive range of environmental parameters with high accuracy. The parameters include, but are not limited to, carbon monoxide (CO), particulate matter, hydrogen sulfide ($H_2S$), volatile organic compounds (VOCs), volatile sulfur compounds (VSCs), sulfur dioxide ($SO_2$), carbon dioxide ($CO_2$), nitrogen dioxide ($NO_2$), methane, temperature, and humidity. The environmental parameter determination sensing module may include a plurality of different sensors tailored to specific use cases or situations. Examples of these sensors, along with their respective functionalities, are as follows:

Barometric Pressure Sensor: Measures atmospheric or barometric pressure.

CO Sensor: Monitors the concentration of CO in the air.

$CO_2$ Sensor: Monitors the concentration of $CO_2$ in the air.

Conductivity Sensor: Assesses water quality by measuring its conductivity.

Dissolved Oxygen Sensor: Monitors the amount of oxygen dissolved in water bodies.

Humidity Sensor: Measures the level of humidity in the air.

Light Sensor: Measures the intensity of light.

Nitrate Sensor: Used in agriculture to measure nitrate concentration in soil or water.

$NO_2$ Sensor: Monitors the concentration of $NO_2$ in the air.

Noise Sensor: Measures environmental noise levels, useful in urban planning.

Ozone Sensor: Measures the concentration of ozone ($O_3$) in the atmosphere.

Particulate Matter Sensor: Detects fine and coarse particulate matter in the air.

pH Sensor: Measures the acidity or alkalinity of soil or water.

Radon Sensor: Measures the concentration of radon.

Rain Gauge: Records the amount of rainfall over a specified period.

$SO_2$ Sensor: Monitors the concentration of $SO_2$ in the air.

Soil Moisture Sensor: Measures the moisture content in soil.

Temperature Sensor: Measures ambient temperature.

VOC Sensor: Monitors the concentration of various volatile organic compounds.

Wind Speed Sensor: Measures wind speed, commonly used in weather stations.

Each sensor is specialized to provide detailed and accurate measurements of the respective environmental parameter, contributing to a comprehensive environmental assessment.

In an embodiment, the wireless connectivity module is configured for effective transmission of the environmental data stream between the individual sensing nodes 110 and the central cloud server 116. The wireless connectivity module is designed to establish and maintain connections with neighboring nodes 110, thereby facilitating a seamless and uninterrupted flow of communication within the network 112. The choice of wireless communication technology employed by the wireless connectivity module may vary depending on several factors, including but not limited to the size of the network 112, specific data transmission paradigms, and power consumption constraints. Technologies that may be utilized include Wi-Fi™, Zigbee, LoRaWAN (Long Range Wide Area Network), and various cellular network protocols.

LoRaWAN may be particularly suitable for long-range, low-power communication between Internet of Things (IoT) devices. The technology is advantageous for extensive IoT networks due to its ability to support a large number of devices connected to a single network. In an embodiment, the utilization of LoRaWAN is provided for its adaptive data rate feature. The feature enables the network 112 using LoRaWAN to dynamically optimize data transmission based on each device's location and signal strength, which significantly enhances the efficiency and capacity of the network 112. Such optimization provides for maintaining robust and efficient communication across extensive and varied network topographies, thereby ensuring reliable data transmission and enhancing the overall performance of the environmental monitoring system 100.

In an embodiment, the power source provides the necessary electrical energy to each sensing node 110 within the system 100. The power source may be designed as a dual battery system, comprising a combination of a rechargeable battery and a high-capacity non-rechargeable battery. In an exemplary implementation, each sensing node 110 is equipped with a power management circuit. The circuit is primarily configured to draw power from the rechargeable battery under normal operating conditions.

Furthermore, the circuit is designed with an intelligent monitoring capability, which continuously assesses the charge level of the rechargeable battery. Upon detecting that the battery's capacity has fallen below a pre-set percentage, the power management circuit automatically switches the node's power source to the high-capacity non-rechargeable battery. The automatic switching mechanism ensures the continuous operation of the sensing node, even in scenarios where capacity of the rechargeable battery is temporarily depleted.

Furthermore, when the capacity of the rechargeable battery is restored above a certain threshold-a process facilitated by an energy harvesting unit, such as a solar panel, which recharges the battery—the power management circuit seamlessly reverts back to utilizing the rechargeable battery. The dual-mode approach to power management offers several significant advantages. Notably, the dual-battery system ensures the uninterrupted functioning of the sensing node, even during periods when energy harvesting (e.g., solar power) is limited or unavailable, thus enhancing the reliability and operational continuity of the environmental monitoring system 100.

The data collecting devices 110 may be connected to one another through the network gateway 114 or the network 112 to transmit data. The data collecting devices 110 may be further connected to the network server 116 through the network gateway 114 to provide data transmission and interoperability between different network protocols of the data collecting devices 110.

The network 112 may be configured as a wired, wireless, or hybrid (partially wired and wireless) network based on a type of communication links used for connecting devices. The wired network 112 may include physical cables, such as Ethernet™ cables, to connect components in the system 100. The wireless network 112 may include Wi-Fi, Wi-Max™, radio-frequency identification (RFID), or Bluetooth™ functionality to connect components in the system 100. The hybrid network may include a combination of wired and wireless networks. Ethernet™ connections may be made between switches and routers (not shown) to provide wireless connections between the terminals (not shown) using wireless connections.

The network 112 may be a Low Power Wide Area Network (LPN) configured to include a plurality of network protocols such as LoRa and/or LoRaWAN protocols. A LoRa protocol is a network protocol that utilizes low-power and long-range wireless technology within a wireless spectrum. A LoRaWAN protocol is an open, cloud-based protocol that enables devices to communicate wirelessly with LoRa. The LoRaWAN protocol uses a LoRa modulation technique to enable low data rate communication over long distances while minimizing power consumption.

The network gateways 114 may be configured to provide communication between networks or devices with different protocols, for example between the network 112 and the data collecting device 110a when the former is using the LoRa protocol and the latter is using the LoRaWAN protocol. The network gateway 114 may provide protocol conversion service, allowing networks 112 with different architectures and communication standards to connect and transmit data. The network gateway 114 may be configured to translate and convert data between different network protocols, such as LoRa and LoRaWAN. Furthermore, the network gateway 114 may be configured to perform address translation (for example, Network Address Translation (NAT) service, data filtering and security, and routing and traffic management).

The network gateways 114 may provide a communication link between wireless communication modules in the data collecting devices 110 and a processing station (not shown). Furthermore, the network gateways 114 may provide data processing such as filtering, compression, or validation to optimize data transmission.

In an embodiment, the intermediate nodes 110b and 110c engage in a process analogous to that of the tail-end and front-end nodes. The middle intermediate nodes 110b, 110c integrate their own environmental data stream with the incoming data point received from the preceding node in the sequence. The combined data is then successively transmitted towards the first intermediate node 110b. As the data point progresses through each middle intermediate node, from 110b1 to 110bn, the data is incrementally enriched with the environmental data from each respective node. Upon reaching the first intermediate node 110b, the node further contributes its environmental data to the transmitted data, thereby creating a second data point. The second data point is then forwarded to the head-end node 110a, which represents the final stage of the data transmission chain within the system 100.

Upon receipt, the head-end node 110a adds its environmental data to this second data point, culminating in the formation of a third and final data point. The comprehensive data point, now encapsulating environmental data from the entire array of nodes, is transmitted to the LoRaWAN gateway 114. The LoRaWAN gateway 114, functioning as a bridge in the network 112, receives this data through radio frequencies via the network 112, and subsequently relays the data to the cloud server 116.

The data collecting device 110 is configured to operate on a plurality of modes of operation or data transmission or network protocols. The wireless communication module may be configured to provide a plurality of modes of operation or data transmission or network protocols. The plurality of modes of operation may include LoRa end-node, LoRaWAN end-node, LoRa repeater mode, and LoRa to LoRaWAN mode. The modes of operation may represent various interoperability operations and utilities such as low battery consumption (LoRa), long-distance communication (LoRaWAN), extending communications (repeater mode), and interoperability between LoRa and LoRaWAN protocols, respectively. The data collecting device 110 may select the mode of operation or data transmission based on the location of the device 110 in the network 112. The data collecting device 110 may automatically select the mode based on the protocol through which data is received. For example, a LoRa mode may be selected on receiving a LoRa message or a LoRaWAN mode may be selected on receiving a LoRaWAN message.

In an embodiment, the network gateway 114 may be configured as a LoRaWAN gateway 114. Where one of the data collecting devices 110 receives only a LoRaWAN message from a LoRaWAN gateway 114 (i.e., has a direct connection to the gateway 114), the data collecting device 110 selects a mode corresponding to a LoRaWAN end-node mode. Similarly, the data collecting device may select the LoRaWAN end-node mode on receiving a LoRaWAN message from a neighboring data collecting device. In the LoRaWAN end-node mode, the data collecting device 110 collects sensor data from sensors (such as those of the sensor assembly 3030 shown in FIG. 3) within the data collecting device 110 for transmission over the network 112 via a further LoRaWAN message.

If the data collecting device 110a receives a LoRaWAN message from a LoRaWAN gateway 114 and further receives a LoRa message from the data collecting device 110b, the data collecting device 110a selects a LoRa to LoRaWAN mode. In the LoRa to LoRaWAN mode, the data collecting device 110a receives data from the data collecting device 110b via LoRa messages (i.e., receives data collected by the sensors of the data collecting device 110b) and merges data from the sensors (such as those of the sensor assembly 3030 shown in FIG. 3) of the data collecting device 110a with the received data from the data collecting device 110b for transmission over the network 112 in the LoRaWAN protocol to be received by the gateway 114. Merging the data may include aggregating the data of the device 110a with the device 110b without altering or compressing the data of the device 110a or the data of the device 110b. Merging the data may include pre-processing, altering, compressing, or post-processing the data of the device 110a or the data of the device 110b.

If the data collecting device 110 receives only LoRa messages from the other data collecting devices 110, the data collecting device 110 selects a LoRa repeater mode. In the LoRa repeater mode, the data collecting device 110 receives data from the other data collecting devices 110 via LoRa messages (i.e., receives data collected by the sensors of the other data collecting devices 110) and merges data from the sensors of the other data collecting devices 110 with data from sensors of the device 110 for transmission via LoRa messages over the network 112.

If one of the data collecting devices 110 is located at an end of the network 112 away from any network gateway 114 (e.g., the tail-end node 110d), then the data collecting device 110 may transmit data from its own sensors over LoRa messages to one or more other data collecting devices 110. Further, if the data collecting device 110 does repeat the transmission of the environmental data and does not have direct access to any LoRaWAN gateway 114, then the data collecting device 110 may transmit data from its own sensors over LoRa messages to one or more other data collecting devices 110.

The system 100 may further include computer terminals (not shown) for accessing the processed data from the environmental data monitoring system 100, for example outputs of the processing station transmitted through the application servers. The terminals may include mobile devices, smartphones, tablets, desktop computers, laptops, thin clients, kiosks, data processing terminals, and workstations.

The LoRaWAN gateway 114 facilitates the long-distance transmission of data from a plurality of end devices. The gateway 114 is suitable in a range of IoT applications such as smart cities, agriculture, metering, and environmental monitoring. Additionally, the gateway 114 supports bi-directional communication, enabling the gateway 114 not only to receive data from the end devices 110a, 110d but also to send control messages or configuration adjustments back to these devices.

In an embodiment, the cloud server 116 leverages advanced machine learning or artificial intelligence-based techniques to process and analyze the received data. The analysis informs the operational modes assigned to each sensing node 110, considering factors such as the relative position and the communication capabilities of the node 110. Depending on these factors, each sensing node 110 may operate in either a LoRa to LoRaWAN mode or a LoRa Repeater mode. In the LoRa to LoRaWAN mode, sensing nodes 110 may receive both LoRaWAN messages from the LoRaWAN gateway 114 and LoRa messages from neighboring sensing nodes 110. Conversely, in the LoRa Repeater mode, sensing nodes 110 primarily receive and relay LoRa messages from adjacent sensing nodes 110, while also appending their sensor data to the transmitted data. The LoRa Repeater mode is particularly advantageous for sensing nodes 110 that are not within direct communication range of the LoRaWAN gateway 114, as it allows them to function as data relays or repeaters. The dual functionality of these modes significantly optimizes data transmission efficiency, catering to diverse environmental and communication conditions. The flexibility of the sensing nodes 110 to toggle between these modes amplifies the overall efficiency and robustness of the environmental monitoring system 100.

In an embodiment, the cloud server 116 provides for optimizing efficiency of the network 112 by assigning a specific frequency channel for data transmission to each sensing node 110 within the system 100. The criteria for channel assignment are multifaceted and may include considerations such as avoiding channel interference, accommodating the unique propagation characteristics of the environment in which the system 100 operates, and ensuring effective load balancing across the available spectrum. Upon determining the optimal frequency channel for each sensing node 110, the cloud server 116 strategically schedules the transmission times for each sensing node 110.

The scheduling is meticulously planned to ensure that data is relayed across the network 112 in the most efficient manner possible, following a sequential path that hops from one sensor node 110 to the next sensor node 110 until ultimately reaching the gateway 114. The orchestration of transmission times not only facilitates efficient data flow but also significantly contributes to reducing the power consumption of each data collection device 110 in the network 112. By precisely defining the active transmission and reception periods for each sensing node 110, the system 100 ensures that the sensing nodes 110 remain inactive when not in use, thereby conserving energy. The selective activation and deactivation of the sensing nodes 110, governed by the cloud server 116, provides for optimizing energy usage across the network 112.

In an embodiment, the cloud server 116 extends its functionality beyond network management. The cloud server 116 is also utilized for processing and analysis of the collected data. This capability allows for the secure storage of environmental data and facilitates remote access, enabling users to monitor and analyze environmental conditions from any location. The integration of these features in the cloud server 116 thereby enhances the overall performance of the system 100, providing a robust solution for comprehensive environmental monitoring and management.

Figure 2:
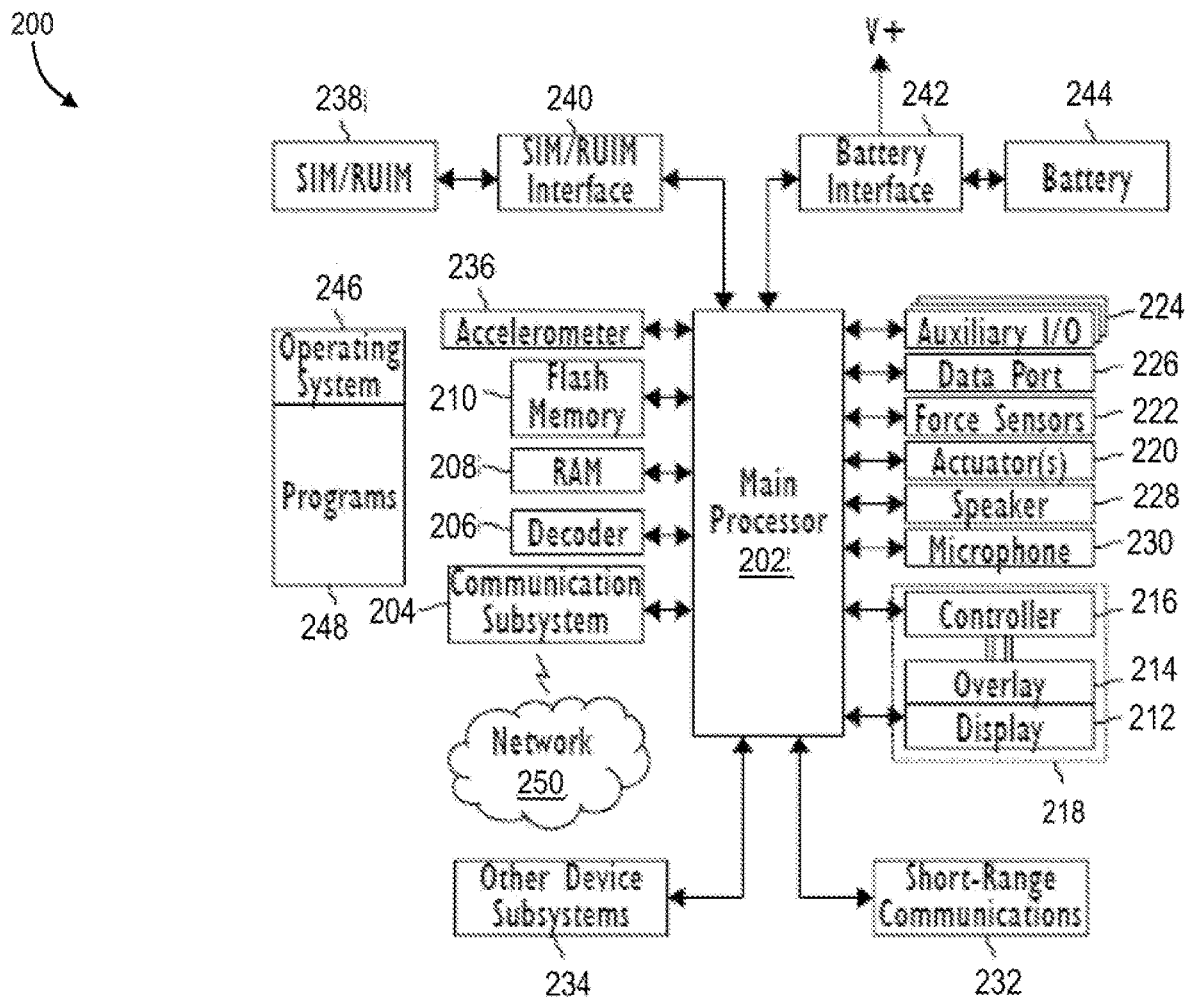
FIG. 2 is a simplified block diagram of components of a device, according to an embodiment.

Referring now to FIG. 2, shown therein is a simplified block diagram of components of a device 200, according to an embodiment. The device 200 may correspond to any of the data collecting devices 110 shown in FIG. 1. The device 200 includes a processor 202 that controls the operations of the device 200. The processor 202 may be a low-power processing module in the data collecting device 110. Communication functions, including data communications, voice communications, or both may be performed through a wireless communication subsystem 204. The communication subsystem may be a wireless connectivity module in the data collecting device 110. The communication subsystem 204 may receive messages from, and send messages to, a wireless network 250. The wireless network may be the network 112 in FIG. 1. Data received by the device 200 may be decompressed and decrypted by a decoder 206.

The wireless network 250 may be any type of wireless network, including, but not limited to, data-centric wireless networks, voice-centric wireless networks, and dual-mode networks that support both voice and data communications.

The device 200 may be a battery-powered device and as shown includes a battery interface 242 for connecting to one or more rechargeable batteries 244. The device 200 may include a power supply assembly (not shown). The device 200 may further include one or more non-rechargeable batteries (not shown).

The processor 202 also interacts with additional subsystems such as a Random Access Memory (RAM) 208, a flash memory 210, a display 212 (e.g. with a touch-sensitive overlay 214 connected to an electronic controller 216 that together comprise a touch-sensitive display 218), an actuator assembly 220, one or more optional force sensors 222, an auxiliary input/output (I/O) subsystem 224, a data port 226, a speaker 228, a microphone 230, short-range communications systems 232 and other device subsystems 234.

In some embodiments, user-interaction with the graphical user interface may be performed through the touch-sensitive overlay 214. The processor 202 may interact with the touch-sensitive overlay 214 via the electronic controller 216. Information, such as text, characters, symbols, images, icons, and other items that may be displayed or rendered on a portable electronic device generated by the processor 202 may be displayed on the touch-sensitive display 218.

The processor 202 may also interact with an accelerometer 236 as shown in FIG. 2. The accelerometer 236 may be utilized for detecting direction of gravitational forces or gravity-induced reaction forces.

To identify a subscriber for network access according to the present embodiment, the device 200 may use a Subscriber Identity Module or a Removable User Identity Module (SIM/RUIM) card 238 inserted into a SIM/RUIM interface 240 for communication with a network (such as the wireless network 250). Alternatively, user identification information may be programmed into the flash memory 210 or performed using other techniques.

The device 200 also includes an operating system 246 and software components 248 that are executed by the processor 202 and which may be stored in a persistent data storage device such as the flash memory 210. Additional applications may be loaded onto the device 200 through the wireless network 250, the auxiliary I/O subsystem 224, the data port 226, the short-range communications subsystem 232, or any other suitable device subsystem 234.

For example, in use, a received signal such as a text message, an e-mail message, web page download, or other data may be processed by the communication subsystem 204 and input to the processor 202. The processor 202 then processes the received signal for output to the display 212 or alternatively to the auxiliary I/O subsystem 224. A subscriber may also compose data items, such as e-mail messages, for example, which may be transmitted over the wireless network 250 through the communication subsystem 204.

For voice communications, the overall operation of the device 200 may be similar. The speaker 228 may output audible information converted from electrical signals, and the microphone 230 may convert audible information into electrical signals for processing.

Referring now to FIG. 3, shown therein is a block diagram of a data collecting device 300 for environmental data monitoring, according to an embodiment. The data collecting device 300 may be a data collecting device or sensing node 110 of FIG. 1.

The data collecting device 300 includes a processor 302 for executing computer instructions stored on a memory 306.

The data collecting device 300 further includes a power supply assembly 304 for powering the data collecting device 300. The power supply assembly 304 may be an integrated power supply assembly 304 integrated into or integral with the device 300. The integrated power source 304 ensures the sustained operation of each device 300, making the system in which the data collecting device 300 is deployed robust and reliable for long-term environmental monitoring.

The processor 302 includes a sensor assembly 3030 including including a position determination sensor 3032 and an environmental parameter determination sensing module 3034. Further and/or other sensors may be provided or included in the sensor assembly 3030.

The position determination sensor 3032 provides for ascertaining the current geographical location of each data collective device 300 and accurately indexing the environmental data collected, ensuring that each data point is precisely associated with its geographic origin. The position determination sensor 3032 may utilize a variety of technologies to achieve precise location determination, including but not limited to the Global Positioning System (GPS), Global Navigation Satellite System (GNSS), or other advanced localization techniques. The capability of each device 300 to calculate its coordinates accurately is advantageous in associating the collected environmental data with specific geographic locations. Such functionality not only provides spatial context to the gathered information but also facilitates the creation of detailed, location-specific environmental maps, enhancing the utility and applicability of the data.

The environmental parameter determination sensing module 3034 provides for measuring a variety of environmental parameters. The data collected by the module 3034 is systematically indexed with the geographically determined location (as ascertained by the position determination sensor 3032), resulting in the creation of an enriched environmental data stream. The integration of locational and environmental data enhances the depth and usability of the information gathered, allowing for more nuanced analysis and application.

The sensing module 3034 measures a comprehensive range of environmental parameters with high accuracy. The parameters include, but are not limited to, carbon monoxide (CO), particulate matter, hydrogen sulfide ($H_2S$), volatile organic compounds (VOCs), volatile sulfur compounds (VSCs), sulfur dioxide ($SO_2$), carbon dioxide ($CO_2$), nitrogen dioxide ($NO_2$), methane, temperature, and humidity. The module 3034 may encompass a variety of specific sensors tailored to specific use cases and situations. Examples of these sensors, along with their respective functionalities, are as follows:

Barometric Pressure Sensor: Measures atmospheric or barometric pressure.
CO Sensor: Monitors the concentration of CO in the air.
$CO_2$ Sensor: Monitors the concentration of $CO_2$ in the air.
Conductivity Sensor: Assesses water quality by measuring its conductivity.
Dissolved Oxygen Sensor: Monitors the amount of oxygen dissolved in water bodies.
Humidity Sensor: Measures the level of humidity in the air.
Light Sensor: Measures the intensity of light.
Nitrate Sensor: Used in agriculture to measure nitrate concentration in soil or water.
$NO_2$ Sensor: Monitors the concentration of $NO_2$ in the air.
Noise Sensor: Measures environmental noise levels, useful in urban planning.
Ozone Sensor: Measures the concentration of ozone ($O_3$) in the atmosphere.
Particulate Matter Sensor: Detects fine and coarse particulate matter in the air.
pH Sensor: Measures the acidity or alkalinity of soil or water.
Radon Sensor: Measures the concentration of radon.
Rain Gauge: Records the amount of rainfall over a specified period.
$SO_2$ Sensor: Monitors the concentration of $SO_2$ in the air.
Soil Moisture Sensor: Measures the moisture content in soil.
Temperature Sensor: Measures ambient temperature.
VOC Sensor: Monitors the concentration of various volatile organic compounds.
Wind Speed Sensor: Measures wind speed, commonly used in weather stations.

Each sensor is specialized to provide detailed and accurate measurements of the respective environmental parameter, contributing to a comprehensive environmental assessment.

The processor includes a wireless connectivity module 3022 (such as a LoRaWAN transceiver) for facilitating wireless connection of the data collecting device 300 to other such data collecting devices 300 and to a central system, such as the system 100 of FIG. 1. The wireless connectivity module 3022 may be a LoRaWAN transceiver. The wireless connectivity module 3022 provides for effective transmission of the environmental data stream between the individual nodes 110 and the central cloud server 116. The module 3022 is configured to establish and maintain connections with neighboring nodes 110, thereby facilitating a seamless and uninterrupted flow of communication within the network 112. The choice of wireless communication technology employed by the module 3022 may vary depending on several factors, including but not limited to the size of the network, specific data transmission paradigms, and power consumption constraints. Technologies that may be utilized include Wi-Fi, Zigbee™, LoRaWAN (Long Range Wide Area Network), and various cellular network protocols.

LoRaWAN may be particularly suitable for long-range, low-power communication between Internet of Things (IoT) devices. The technology is advantageous for extensive IoT networks due to its ability to support a large number of devices connected to a single network. In an embodiment, the utilization of LoRaWAN is provided for its adaptive data rate feature. The feature enables the network 112 using LoRaWAN to dynamically optimize data transmission based on each device's location and signal strength, which significantly enhances the efficiency and capacity of the network 112. Such optimization provides for maintaining robust and efficient communication across extensive and varied network topographies, thereby ensuring reliable data transmission and enhancing the overall performance of the environmental monitoring system 100.

In an embodiment, the data collection device 300 includes a power assembly 304 for providing the necessary electrical energy to each node within system 100. The power supply assembly 304 includes a power source 3042 to store and provide electrical power, a charging unit 3044 to charge the power source, and a circuit 3046 to provide control of the electrical current. The charging unit 3044 may include a solar charging apparatus including a solar panel.

The power source 3042 may be designed as a dual battery system, comprising a combination of a rechargeable battery and a high-capacity non-rechargeable battery. In an exemplary implementation, each sensing node is equipped with a power management circuit 3046. The circuit 3046 is primarily configured to draw power from the rechargeable battery under normal operating conditions.

Further, the circuit 3046 is designed with an intelligent monitoring capability, which continuously assesses the charge level of the rechargeable battery. Upon detecting that the battery's capacity has fallen below a pre-set percentage, the power management circuit automatically switches the node's power source to the high-capacity non-rechargeable battery. The automatic switching mechanism ensures the continuous operation of the sensing node, even in scenarios where the rechargeable battery's capacity is temporarily depleted.

Furthermore, when the rechargeable battery's capacity is restored above a certain threshold—a process facilitated by an energy harvesting unit, such as a solar panel, which recharges the battery—the power management circuit seamlessly reverts back to utilizing the rechargeable battery. The dual-mode approach to power management offers several significant advantages. Notably, the dual battery system ensures the uninterrupted functioning of the sensing node, even during periods when energy harvesting (e.g., solar power) is limited or unavailable, thus enhancing the reliability and operational continuity of the environmental monitoring system.

In an embodiment, the power source 3042 includes a plurality of batteries. The power source 3042 may include a non-rechargeable and a rechargeable battery. The rechargeable battery may be a solar cell. The plurality of batteries may include rechargeable batteries and high-capacity non-rechargeable batteries. The power supply assembly 304 may further include a power collection apparatus (not shown). The power collection apparatus may include a solar cell for charging the plurality of batteries. The rechargeable battery may serve as a first power source until an energy level of the rechargeable battery reaches a predetermined limit. The non-rechargeable battery may serve as a second power source when the energy level is at the predetermined limit until the rechargeable battery is recharged so that the energy level is not at the predetermined limit.

The power management circuit 3046 may be configured as a smart power management circuit. The smart power management circuit 3046 may recharge a battery of the charging unit 3044 until the battery capacity drops below a threshold (e.g., 30%). At that point, the circuit 3046 may switch to a high-capacity non-rechargeable battery until the rechargeable battery recharges to a predetermined threshold (80%). This feature reduces power consumption of the device 300. Furthermore, the circuit 3046 may optimize warm-up times of the sensors 3032-3034 and intervals in data transmission between the data collecting devices 300 and the intervals of data collection by the sensors 3032-3034.

The wireless connectivity module 3022 includes a radio frequency receiver 3023 to transmit and receive signals at specific radio frequencies and at specific time intervals. The wireless connectivity module 3022 includes an antenna 3025 configured to convert the signals into electromagnetic waves for transmission. The wireless connectivity module 3022 may be configured to connect the components within the data collecting device 300, including the processor 302, sensor assembly 3030, power supply assembly 304, and memory 306.

In an embodiment, in addition to the wireless communication module 3022, the data collecting device 300 includes a wired communication module (not shown) suitable to communicate with other data collecting devices 300 and the network gateway 114 over a hybrid network 112 as discussed in FIG. 1. Alternatively, a wired network 112 may be provided, and the data collecting device 300 may include a wired communication module (not shown) configured to communicate with other data collecting devices 300 and the network gateway 114.

The wireless connectivity module 3022 is configured to transmit data collected by the sensors 3032-3034 to the network gateway 114 or other data collecting devices 300 within the environmental data monitoring system 100. The wireless connectivity module 3022 may connect the data collecting device 300 to the network 112. The wireless connectivity module 3022 may also provide services including packet formation, error checking, encryption and addressing. The wireless connectivity module 3022 may provide network management tasks, including discovery of data collecting devices 300, configuration of the network 112, and maintaining connections with other data collecting devices 300.

The wireless connectivity module 3022 may also be configured to manage communication protocols such as Wi-Fi™, Zigbee™, Bluetooth™, LoRa and LoRaWAN to facilitate secure data transmission with low power consumption. In an embodiment, the wireless connectivity module 3022 is configured as a LoRa wireless connectivity module and/or or a LoRaWAN connection module.

The data collecting device 300 is configured to operate in a plurality of modes of operation or data transmission. The plurality of modes include LoRa end-node, LoRaWAN end-node, LoRa repeater mode, and LoRa to LoRaWAN mode. The modes of operation may represent various interoperability operations and utilities such as low battery consumption (LoRa), long-distance communication (LoRaWAN), extending communications (repeater mode), and interoperability between LoRa and LoRaWAN protocols, respectively. The wireless connectivity module 3022 further includes a protocol management submodule 3027 for automatically selecting the mode based on the location of the device 300 in the network 112. The protocol management submodule 3027 may automatically select the transmission mode based on the protocol through which the data is received. For example, a LoRa mode may be selected on receiving a LoRa message or a LoRaWAN mode may be selected on receiving a LoRaWAN message. The network 112 may include low power dynamic wireless sensor networks.

LoRa (Long Range) includes a digital wireless data communication technology that utilizes low frequency radio frequency bands and modulation techniques to provide long-range communication and low power consumption. The LoRa protocol may address the physical layer of communication and format the data sent and received between the data collecting devices 300. LoRaWAN (Long Range Wide Area Network) includes a standardized protocol built upon LoRa technology providing higher abstraction. The LoRaWAN protocol may include both the communication protocol and system architecture for a LoRa-based network 112 to enable efficient, secure, scalable data transmission between data collecting devices 300 and the network gateway 114.

To enable low-power functionality, the protocol management submodule 3027 may be configured to provide protocol management for LoRa and LoRaWAN data transmission protocols, including providing services for each protocol. The services may include packet formation, error checking, device detection, addressing, and encryption. The protocol management submodule 3027 may format the data collected by the sensors into packets in accordance with LoRa or LoRaWAN specifications based on paradigms of the network 112. Such formatting includes adding headers, metadata and control information for proper routing and processing by the network gateway 114 or other devices of the system 100. The LoRaWAN protocol may rely on error checking mechanisms such as Cyclic Redundancy Check (CRC) or Forward Error Correction (FEC) to detect and correct errors during data transmission. The protocol management submodule 3027 may be configured to implement the error checking and provide data integrity and reliability information. Further, the LoRaWAN protocol may utilize device identifiers (DevEUI) and network identifiers (NetID) to address the data collecting devices 300 on the system 100. The protocol management submodule 3027 may be configured to manage an addressing scheme therefor and to provide data transmission between the data collecting devices 300 and routing within the system 100. Furthermore, the LoRaWAN protocol may utilize an adaptive data rate mechanism that adjusts data rates and transmission power of the devices 300 based on the distance of each device 300 from the gateway 114 and further based on conditions of the network 112. The protocol management submodule 3027 may be configured to manage this feature, optimizing energy consumption and network capacity.

To provide security services, the protocol management submodule 3027 may be configured to implement security features of LoRaWAN or LoRa security features. The protocol management submodule 3027 may be configured to implement encryption mechanisms such as Advanced Encryption Standard (AES) with a 128-bit key to protect sensitive information from unauthorized access.

The protocol management submodule 3027 may be configured to perform network and protocol related tasks, including device activation and joining procedures and acknowledging and processing messages sent from the network gateway 114.

The protocol management submodule 3027 may also provide for and/or enable optimized power consumption to save energy and extend battery life of each device 300. Such optimized power consumption may include time-synchronization and entering low-power modes when each device 300 is not actively transmitting or receiving data. The protocol management submodule 3027 may be configured to operate the time synchronization with respect to each of the sensors 3032-3034. The sensors 3032-3034 and processor 302 may be optimized for reduced power consumption through time synchronization techniques. The time synchronization techniques may include duty cycling, time-slotted communication, coordinated sensing, power-efficient routing, and reduced idle listening. The processor 302 may be configured to activate data collection in the sensors 3032-3034 at predefined time schedules and enter low-power inactive modes outside of the predefined time schedules and/or cause the sensors 3032-3034, the radio-frequency (RF) receiver 2023, and the antenna 3025 to enter low-power inactive modes outside the predefined time schedules. Similarly, the protocol management submodule 3027 may be configured to receive and transmit environmental data at predefined time schedules and alternatively enter low-power inactive modes.

Data sensed by the sensors 3032-3034 is stored in the memory 306 as environmental data 3062. The sensors 3032-3034 are configured to collect and monitor the environmental data 3062 to facilitate detection of environmental conditions. The conditions may include detecting, identifying, and measuring the environmental data 3062 in proximity to the sensors 3032-3034 such as chemicals, gases, and physical conditions such as temperature and humidity. When environmental data 3062 received at a device 300 from a different device 300 is merged with environmental data 3062 collected at the device 300, such merged data is stored in the memory 306 as merged data 3064.

Figure 4:
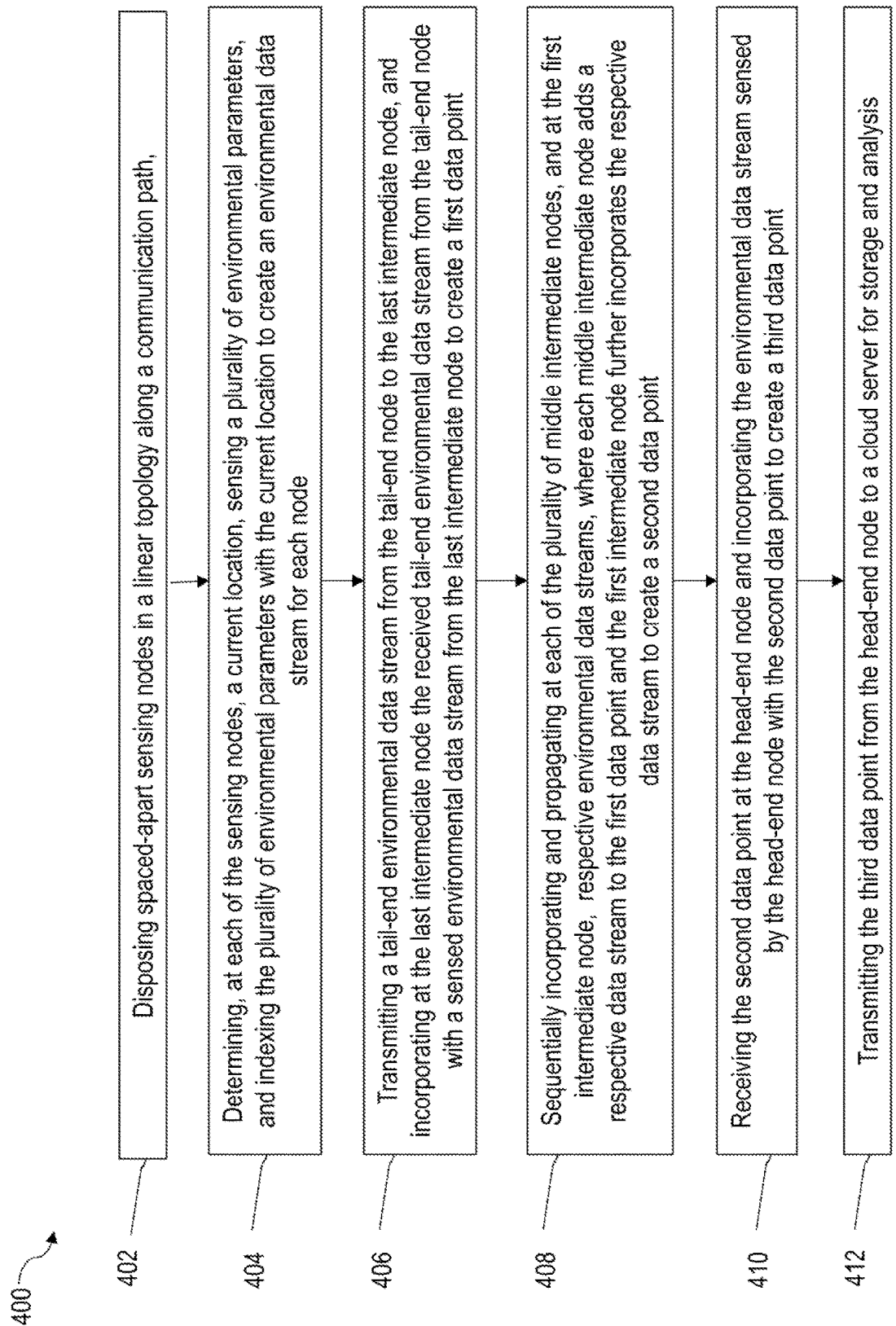
FIG. 4 is a flow diagram of a data collecting method for environmental monitoring, according to an embodiment.

Referring now to FIG. 4, shown therein is a flow diagram of a data collecting method 400 for environmental monitoring using an array of sensing nodes, according to an embodiment.

In an embodiment, the array of is a plurality of sensing nodes 110 of FIG. 1. Each sensing node 110 may be the data collecting device 300 of FIG. 3. In an embodiment, the sensing nodes 110 are arranged in a linear topology along a communication path.

At 402, the sensing nodes are deployed. The sensing nodes are disposed in a spaced-apart manner and arranged in a linear topology along a designated communication path. The array configuration includes a tail-end node, a head-end node, and a plurality of intermediate nodes disposed between the tail-end node and the head-end node. The intermediate nodes further include a first intermediate node disposed towards the head-end node, a last intermediate node disposed towards the tail-end node, and a plurality of middle intermediate nodes disposed between the first intermediate node and the last intermediate node. Notably, each node in the array is equipped with both a position determination sensor and an environmental parameter determination sensing module.

At 404, each sensing node within the array independently determines its current geographic location. The sensing nodes each further measure or sense a plurality of environmental parameters. Determination of the current geographic location and measuring or sensing the plurality of environmental parameters may occur concurrently. The collected environmental data is indexed with the determined current location to create an environmental data stream for each node.

At 406, the tail-end node creates a tail-end environmental data stream, which includes a range of measured environmental parameters linked to its current location. The tail-end environmental data stream is transmitted to the last intermediate node in the array. The transmission may be facilitated by the wireless connectivity module present in each node. The last intermediate node incorporates the received tail-end environmental data stream from the tail-end node with a sensed environmental data stream from the last intermediate node to create a first data point. The first data point is a comprehensive representation of the environmental conditions along the portion of the array spanning from the tail-end node to the last intermediate node At 408, environmental data propagation occurs through middle intermediate nodes. The first data point is sequentially transmitted through the middle intermediate nodes. Each of these nodes, in turn, adds its own environmental data stream to the first data point. This ensures that the first data point becomes progressively enriched with environmental data from different points along the linear array. The propagation is orderly and maintains the integrity and continuity of the data. Additional integration is provided at the first intermediate node. As the first data point and the environmental data stream reach or are received at the first intermediate node, the first intermediate node incorporates its environmental data stream into the first data point, generating a second data point, which comprises a comprehensive compilation of environmental data from the tail-end node up to the first intermediate node.

At 410, final integration is provided at the head-end node. The head-end node, positioned at the start of the linear array, receives the second data point. The head-end node integrates its own environmental data to the second data point, thereby creating a third data point. The inclusion of the environmental data stream sensed by the head-end node may complete the spectrum of environmental information collected across the array.

At 412, the third data point, comprising the comprehensive environmental data from the entire array, is transmitted to a cloud server for storage and analysis. The cloud server is configured to handle large volumes of data and is responsible for the storage, processing, and analysis of environmental data. The cloud server may leverage advanced algorithms, including machine learning or artificial intelligence techniques, to analyze the environmental data, providing insights into environmental patterns, trends, and anomalies.

In an embodiment, the system, method and device employ LoRaWAN technology, which operates using an unlicensed radio spectrum. The advantage of using unlicensed frequencies provides for a significant reduction of costs associated with acquiring and maintaining licensed frequencies. This aspect of LoRaWAN may provide an economically viable option for environmental monitoring applications.

Additionally, the LoRaWAN gateway, designated as gateway 114 in the system 100 of FIG. 1, is capable of handling communications with thousands of devices. This capacity to manage a large number of devices advantageously enables the use thereof with greatly minimized infrastructure, thereby reducing operational costs, particularly in large-scale deployment scenarios. This feature is especially beneficial for expansive environmental monitoring systems where numerous sensing nodes are deployed over a wide area.

In an embodiment, LoRaWAN technology facilitates bi-directional communication between the environmental monitoring devices and the network server. This capability is crucial for the system's functionality, as it allows for more than just data transmission from the devices.

The bi-directional communication feature enables the remote sending of commands or configuration updates to the devices. This functionality enhances the flexibility and adaptability of the system, allowing for real-time adjustments and optimizations of device settings and operations from a central server. It also simplifies the maintenance and management of the devices, as updates and configurations may be deployed without physical access to each device.

The geolocation capabilities inherent in LoRaWAN technology may be achieved without GPS hardware. This feature represents a cost-effective approach to asset tracking and providing location-based services within the environmental monitoring system.

The gateway collects time-stamped metadata from the devices, which may be used to triangulate their positions. This feature of determining device location is not only economical, as enables the use of each device without disposing GPS modules in each device, but it also offers a reliable means of monitoring the geographic distribution of the sensing nodes. This capability is particularly useful for tracking and managing the deployment of the nodes, ensuring optimal coverage and data collection efficiency.

In an embodiment, LoRaWAN transceiver capability is incorporated to support a plurality of frequency channels for data transmission. This feature provides for enhancing network capacity and reducing interference and may be used for large-scale environmental monitoring deployments. Specifically, the system may adopt an 8-frequency channel configuration for LoRaWAN data transmission, where the LoRaWAN gateway and end devices communicate over eight distinct frequency channels. These channels are evenly spaced within a frequency band appropriate to the region, adhering to varying regulations, such as the 863-870 MHz band in Europe and the 902-915 MHZ band in the United States. The utilization of this multi-channel configuration may provide advantages for the network. The increased number of channels boosts overall network capacity, enabling a larger number of end devices to connect and transmit data to a single gateway concurrently. Furthermore, by distributing communication across the plurality of channels, the likelihood of interference between end devices is substantially reduced. This feature is beneficial in densely populated networks.

In an 8-frequency channel LoRaWAN network, end devices are configured to randomly select one of the eight channels for each data transmission. This ensures an even distribution of network traffic across the available channels and prevents any single channel from becoming overly congested. The gateway, equipped to listen to all eight channels simultaneously, may thus receive data from a plurality of devices at the same time, enhancing the system's data handling capability. Additionally, to ensure reliable communication and compliance with regional standards, the LoRaWAN protocol specifies different frequency bands and channel plans for different regions. These regional parameters, in conjunction with the 8-frequency channel configuration, are crucial considerations in the design and deployment of a LoRaWAN network, ensuring that the network operates efficiently within the legal frameworks of its environment and maintains high levels of performance and reliability.

Supported embodiments include an apparatus, a system, a method, a device, a computer-readable storage medium, a computer program product and/or means for implementing any of the foregoing data collecting devices, methods, or portions thereof.

The detailed description provided above in connection with the appended drawings is intended as a description of examples and is not intended to represent the only forms in which the present examples may be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

In the description of the environmental data monitoring system, various modifications to the embodiments detailed herein are possible without deviating from the scope of the present disclosure, as defined by the accompanying claims. Terms such as "including," "comprising," "incorporating," "have," and "is," which are used throughout this disclosure to describe and claim the present invention, are intended to be inclusive. This means they allow for the presence of additional items, components, or elements that are not expressly mentioned. Additionally, references to singular entities should be understood as including their plural counterparts.

The use of the term "exemplary" in this document is intended to indicate that something serves as an example or illustration. An embodiment described as "exemplary" is not necessarily to be regarded as more preferred or advantageous than other embodiments and does not preclude the integration of features from other embodiments. Similarly, the term "optionally" indicates that certain features may be present in some embodiments and absent in others.

Certain features of the present disclosure, described in the context of separate embodiments for clarity, may be combined in a single embodiment. Conversely, features described within a single embodiment for brevity may be provided separately, in any suitable combination, or be adapted for use in other described embodiments of the disclosure. This flexibility in the application and combination of features ensures that the described system may be tailored to meet specific use cases, situations, paradigms, or preferences, while still falling within the intended scope of the original disclosure.

The invention claimed is:

1. An environmental data monitoring system comprising:
   an array of sensing nodes, disposed in a spaced-apart manner and arranged in a linear topology along a communication path, wherein the array includes:
   a tail-end node; and
   a head-end node;

wherein the tail-end node is configured to transmit a tail environmental data stream sensed thereby to a preceding node;

wherein the array of sensing nodes transmits the environmental data to a cloud server;

wherein the system is configured to automatically select a network protocol from a plurality of network protocols based on the location of each sensing node or a network protocol received from another sensing node in the array.

2. The environmental data monitoring system of claim 1 further comprising a plurality of intermediate nodes, wherein the intermediate nodes include:
   a first intermediate node disposed towards the head-end node;
   a last intermediate node arranged towards the tail-end node; and
   a plurality of middle intermediate nodes disposed between the first and the last intermediate nodes.

3. The environmental data monitoring system of claim 2, wherein each of the tail-end node, the intermediate nodes, and the head-end node comprises:
   a position determination sensor for determining the current location of the respective node;
   an environmental parameter determination sensing module for sensing one or more environmental parameters and indexing the sensed parameters with the determined current location to create an environmental data stream;
   a wireless connectivity module for transmitting the environmental data stream; and
   a power source for providing electric energy for operation of the respective node.

4. The environmental data monitoring system of claim 3, wherein the last intermediate node is configured to incorporate a last intermediate environmental data stream sensed thereby with the received data stream from the tail-end node to create a first data point.

5. The environmental data monitoring system of claim 4, wherein each middle intermediate node is configured to incorporate and propagate a middle intermediate environmental data stream sensed thereby to the first data point towards the first intermediate node.

6. The environmental data monitoring system of claim 5, wherein the first intermediate node is configured to incorporate an environmental data stream sensed by the first intermediate node with the propagated environmental data stream and the first data point to create a second data point.

7. The environmental data monitoring system of claim 6, wherein the head-end node is configured to receive the second data point, incorporate a head environmental data stream sensed thereby to create a third data point, and transmit the third data point to the cloud server.

8. The environmental data monitoring system of claim 1, wherein the cloud server is communicably coupled with a LoRaWAN™ Gateway for receiving the third data point from the head-end node.

9. The environmental data monitoring system of claim 8, wherein each node is configured to selectively operate in one of a LoRa™ to LoRaWAN mode or a LoRa Repeater mode.

10. The environmental data monitoring system of claim 9, wherein the power source of each sensing node is a rechargeable battery or a high-capacity non-rechargeable battery.

11. The environmental data monitoring system of claim 10, wherein the nodes each sense one or more environmental parameters selected from the group consisting of carbon monoxide (CO), particulate matter, hydrogen sulfide ($H_2S$), volatile organic compounds (VOCs), volatile sulfur compounds (VSCs), sulfur dioxide ($SO_2$), carbon dioxide ($CO_2$), nitrogen dioxide ($NO_2$), methane, temperature, and humidity.

12. The environmental monitoring system of claim 1, wherein the cloud server is configured to assign frequency channels to each node for data transmission, optimize transmission times, and manage network efficiency through selective activation and deactivation of nodes to conserve energy, and process and analyze collected data using machine learning or artificial intelligence-based techniques.

13. An environmental data monitoring device, comprising:
   a position determination sensor for determining a geographic location of the environmental monitoring device;
   an environmental parameter determination sensing module capable of measuring one or more environmental parameters selected from the group consisting of carbon monoxide (CO), particulate matter, hydrogen sulfide ($H_2S$), volatile organic compounds (VOCs), volatile sulfur compounds (VSCs), sulfur dioxide ($SO_2$), carbon dioxide ($CO_2$), nitrogen dioxide ($NO_2$), methane, temperature, and humidity;
   a wireless connectivity module for facilitating data transmission within a network;
   a power source including a dual battery system comprising a rechargeable battery and a high-capacity non-rechargeable battery, and a power management circuit to switch between the batteries based on the charge levels of the respective batteries;
   wherein the environmental monitoring device is configured to be arranged in a linear topology within the network.

14. The environmental monitoring device of claim 13, wherein the position determination sensor includes one or more of Global Positioning System (GPS) or Global Navigation Satellite System (GNSS) for accurately determining the geographic location.

15. The environmental monitoring device of claim 13, wherein the wireless connectivity module includes LoRaWAN™ technology for long-range and low-power communication between nodes.

16. A method for collecting environmental data, the method comprising:
   disposing in a spaced-apart manner an array of sensing nodes in a linear topology along a communication path, wherein the array of sensing nodes comprises a tail-end node, a head-end node, and a plurality of intermediate nodes disposed between the tail-end node and the head-end node, the intermediate nodes including a first intermediate node disposed towards the head-end node, a last intermediate node arranged towards the tail-end node, and one or more middle intermediate nodes disposed between the first intermediate node and the last intermediate node;
   at each of the sensing nodes, determining a current location, sensing a plurality of environmental parameters and indexing the plurality of environmental parameters with the current location to create an environmental data stream for each node;
   transmitting the environmental data stream from the tail-end node to the last intermediate node and incorporating, at the last intermediate node, the received environmental data stream from the tail-end node with an environmental data stream sensed at the last intermediate node to create a first data point;

sequentially incorporating and propagating, at each of the middle intermediate nodes and at the first intermediate node, respective sensed environmental data streams, wherein each middle intermediate node adds the respective sensed data stream to the first data point and the first intermediate node further incorporates the respective sensed environmental data stream to create a second data point;

receiving the second data point at the head-end node and incorporating the environmental data stream sensed by the head-end node with the second data point to create a third data point; and transmitting the third data point from the head-end node to a cloud server for storage and analysis.

17. The method of claim 16, wherein each of the sensing nodes includes a position determination sensor and an environmental parameter determination sensing module for determining the current location and the environmental parameters, respectively.

18. The method of claim 16, wherein the environmental parameters determined at each sensing node include at least one of carbon monoxide (CO), particulate matter, hydrogen sulfide ($H_2S$), volatile organic compounds (VOCs), volatile sulfur compounds (VSCs), sulfur dioxide ($SO_2$), carbon dioxide ($CO_2$), nitrogen dioxide ($NO_2$), methane, temperature, and humidity.

19. The method of claim 16, wherein transmitting the third data point to the cloud server includes using a wireless connectivity module, the wireless connectivity module comprising at least one of LoRaWAN™, Wi-Fi, Zigbee, or cellular network technologies.

* * * * *